United States Patent
Kanjiram et al.

(10) Patent No.: US 12,547,386 B2
(45) Date of Patent: Feb. 10, 2026

(54) SYSTEM FOR AUTOMATICALLY GENERATING SCRIPTS TO RUN CONTROLS ASSOCIATED WITH POLICY RULES

(71) Applicant: Capital One Services, LLC, McLean, VA (US)

(72) Inventors: Ashish Kanjiram, Allen, TX (US); Shailaja Masarwala, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 216 days.

(21) Appl. No.: 18/416,644

(22) Filed: Jan. 18, 2024

(65) Prior Publication Data
US 2025/0238211 A1    Jul. 24, 2025

(51) Int. Cl.
*G06F 8/41*    (2018.01)

(52) U.S. Cl.
CPC .............. *G06F 8/427* (2013.01); *G06F 8/43* (2013.01)

(58) Field of Classification Search
None
See application file for complete search history.

(56) References Cited

U.S. PATENT DOCUMENTS

| | | | |
|---|---|---|---|
| 8,250,526 B2 * | 8/2012 | Anderson | G06F 8/72 717/124 |
| 12,277,133 B2 * | 4/2025 | Manzano | G06F 16/254 |
| 2015/0007129 A1 * | 1/2015 | William | G06F 8/30 717/106 |
| 2021/0342357 A1 * | 11/2021 | Garg | G06F 8/30 |
| 2023/0222178 A1 * | 7/2023 | Singh | G06F 18/2148 706/45 |

(Continued)

FOREIGN PATENT DOCUMENTS

WO    WO-2010060466 A1 *  6/2010  ............... G06F 8/34

OTHER PUBLICATIONS

Gruber et al., "DARTR: An R package to facilitate analysis of SNP data generated from reduced representation genome sequencing," Wiley, 2017. (Year: 2017).*

(Continued)

*Primary Examiner* — Ryan D. Coyer
(74) *Attorney, Agent, or Firm* — Harrity & Harrity, LLP (57) ABSTRACT

In some implementations, a system may receive policy data that defines one or more controls and a set of variable definitions associated with the one or more controls in a tabular format. The system may generate a two-dimensional dataframe in which each row corresponds to a policy rule, of the set of policy rules. The system may create a system-generated script that includes a sequence of commands based on the two-dimensional dataframe, wherein each command in the sequence of commands is generated from a row of the two-dimensional dataframe using string manipulations based on information in each column associated with the respective row and the set of variable definitions associated with the one or more controls. The system may execute the system-generated script to generate an output that indicates whether input data subject to the set of policy rules complies with the one or more controls.

20 Claims, 5 Drawing Sheets

(56) References Cited

U.S. PATENT DOCUMENTS

2023/0342332 A1* 10/2023 Higgins .................. G06F 16/13
2024/0028304 A1*  1/2024 Zhai ......................... G06F 8/30

OTHER PUBLICATIONS

Petersohn et al., "Towards Scalable Dataframe Systems," arXiv, 2020. (Year: 2020).*
Tripathi, Piyush, "Python 3 Script for Generating SQL Insert Statements from CSV Data," May 5, 2023, https://www.sqlservercentral.com/scripts/python-3-script-for-generating-sql-insert-statements-from-csv-data.

* cited by examiner

SYSTEM FOR AUTOMATICALLY GENERATING SCRIPTS TO RUN CONTROLS ASSOCIATED WITH POLICY RULES

BACKGROUND

In an organization, controls are often defined to ensure that various processes are in compliance with relevant policies, rules, regulations, guidelines, standards, or the like. The controls generally serve as mechanisms to monitor and verify that certain processes adhere to applicable guidelines in order to mitigate risk, ensure consistency, maintain operational integrity, and provide audit readiness, among other examples. For example, in some cases, an organization may implement preventative controls that are designed to prevent non-compliance issues from occurring, detective controls that are designed to identify and detect non-compliance issues or anomalies, and/or corrective controls that are designed to remediate non-compliance issues that have been identified or detected. In some cases, a controls monitoring system may employ various tools, technologies, and/or methodologies to continuously monitor, assess, review, and validate compliance with the controls that are in place within an organization.

SUMMARY

Some implementations described herein relate to a system for automatically generating scripts to run controls that test for policy data compliance. The system may include one or more memories and one or more processors communicatively coupled to the one or more memories. The one or more processors may be configured to receive policy data that defines one or more controls and a set of variable definitions associated with the one or more controls in a tabular format, wherein the one or more controls are each defined according to a set of policy rules that each include one or more conditions and one or more actions. The one or more processors may be configured to generate a two-dimensional dataframe in which each row corresponds to a policy rule, of the set of policy rules, and each column corresponds to a condition or an action, of the one or more conditions and the one or more actions. The one or more processors may be configured to create a system-generated script that includes a sequence of commands based on the two-dimensional dataframe, wherein each command in the sequence of commands is generated from a row of the two-dimensional dataframe using string manipulations based on information in each column associated with the respective row and the set of variable definitions associated with the one or more controls. The one or more processors may be configured to execute the system-generated script to generate an output that indicates whether input data subject to the set of policy rules complies with the one or more controls.

Some implementations described herein relate to a method for automatically generating scripts. The method may include receiving, by a system, policy data that defines one or more controls and a set of variable definitions associated with the one or more controls in a tabular format. The method may include generating, by the system, a two-dimensional dataframe in which each row corresponds to a policy rule, of the set of policy rules. The method may include creating, by the system, a system-generated script that includes a sequence of commands based on the two-dimensional dataframe, wherein each command in the sequence of commands is generated from a row of the two-dimensional dataframe using string manipulations based on information in each column associated with the respective row and the set of variable definitions associated with the one or more controls. The method may include executing, by the system, the system-generated script to generate an output that indicates whether input data subject to the set of policy rules complies with the one or more controls.

Some implementations described herein relate to a non-transitory computer-readable medium that stores a set of instructions. The set of instructions, when executed by one or more processors of a script generation system, may cause the script generation system to receive policy data that defines one or more controls and a set of variable definitions associated with the one or more controls in a tabular format. The set of instructions, when executed by one or more processors of the script generation system, may cause the script generation system to generate a two-dimensional dataframe in which each row corresponds to a policy rule, of the set of policy rules. The set of instructions, when executed by one or more processors of the script generation system, may cause the script generation system to create a system-generated script that includes a sequence of commands based on the two-dimensional dataframe, wherein each command in the sequence of commands is generated from a row of the two-dimensional dataframe using string manipulations based on information in each column associated with the respective row and the set of variable definitions associated with the one or more controls.

DETAILED DESCRIPTION

The following detailed description of example implementations refers to the accompanying drawings. The same reference numbers in different drawings may identify the same or similar elements.

As described herein, a controls monitoring system generally uses various technologies to continuously monitor, enforce, test, assess, and report on controls within an organization. For example, an automated compliance system may use predefined rules, algorithms, and workflows to assess compliance across different areas within an organization, such as financial, operational, or regulatory compliance. In another example, a continuous controls monitoring (CCM) system may employ automated tools to analyze transactions, data, activities, and/or other information to monitor controls in real-time or on a regular basis (e.g., to detect anomalies, errors, or potential risks in a finance domain, an information technology security domain, or the like). Other controls monitoring systems include governance, risk, and compliance (GRC) platforms that provide a centralized view into a compliance status within an organization (e.g., to enable management of policies, controls, assessments, and/or remediation actions) and risk assessment tools that can be used to evaluate risks and/or compliance with specific controls or processes, among other examples. Accordingly, in many cases, organization may develop or utilize various tools, processes, monitoring platforms, and/or other suitable technologies to ensure compliance with one or more controls, to detect non-compliance with one or more controls, and/or to remediate issues that relate to non-compliance with one or more controls. However, because controls are often specific to a given organization and can vary significantly from one domain to another, deploying and configuring a controls monitoring system tends to involve significant manual elements that can result in code errors and other human error that may lead to instances of non-compliance, failure to detect instances of non-compliance, and/or challenges with remediating instances of non-compliance.

In some implementations, as described herein, a script generation system may be configured to automatically create system-generated scripts to run controls that are each associated with one or more policy rules. For example, the script generation system may receive policy data that includes variable definitions associated with one or more controls that are each represented according to policy rules, with each policy rule being based on a set of conditions that are mapped to a set of actions. In some implementations, the policy rules may be represented in a tabular format, such as a spreadsheet file, and the policy rules are parsed and processed to create a two-dimensional dataframe based on the variable definitions and rule parameters. After the dataframe is checked for errors, the dataframe may be passed to a script generation component that creates the system-generated script by using string manipulations based on each row of the dataframe. The resulting system-generated script can then be executed to test the policy rules against any suitable input data. In this way, the script generation system can be used to create system-generated scripts to prevent, detect, and/or correct non-compliance with one or more controls that relate to relevant policies, rules, regulations, guidelines, standards, or the like within an organization. In this way, by automating the creation of system-generated scripts based on policy data, rule file documentation, variable definitions, and/or other suitable information that captures the intent associated with one or more controls, the system-generated scripts may be automatically created directly from the information that captures the intent associated with one or more controls without any manual coding. In this way, the system-generated scripts may be executed by a suitable controls monitoring system to more reliably and accurately prevent, detect, and/or correct non-compliance with one or more controls.

Figure 1A:
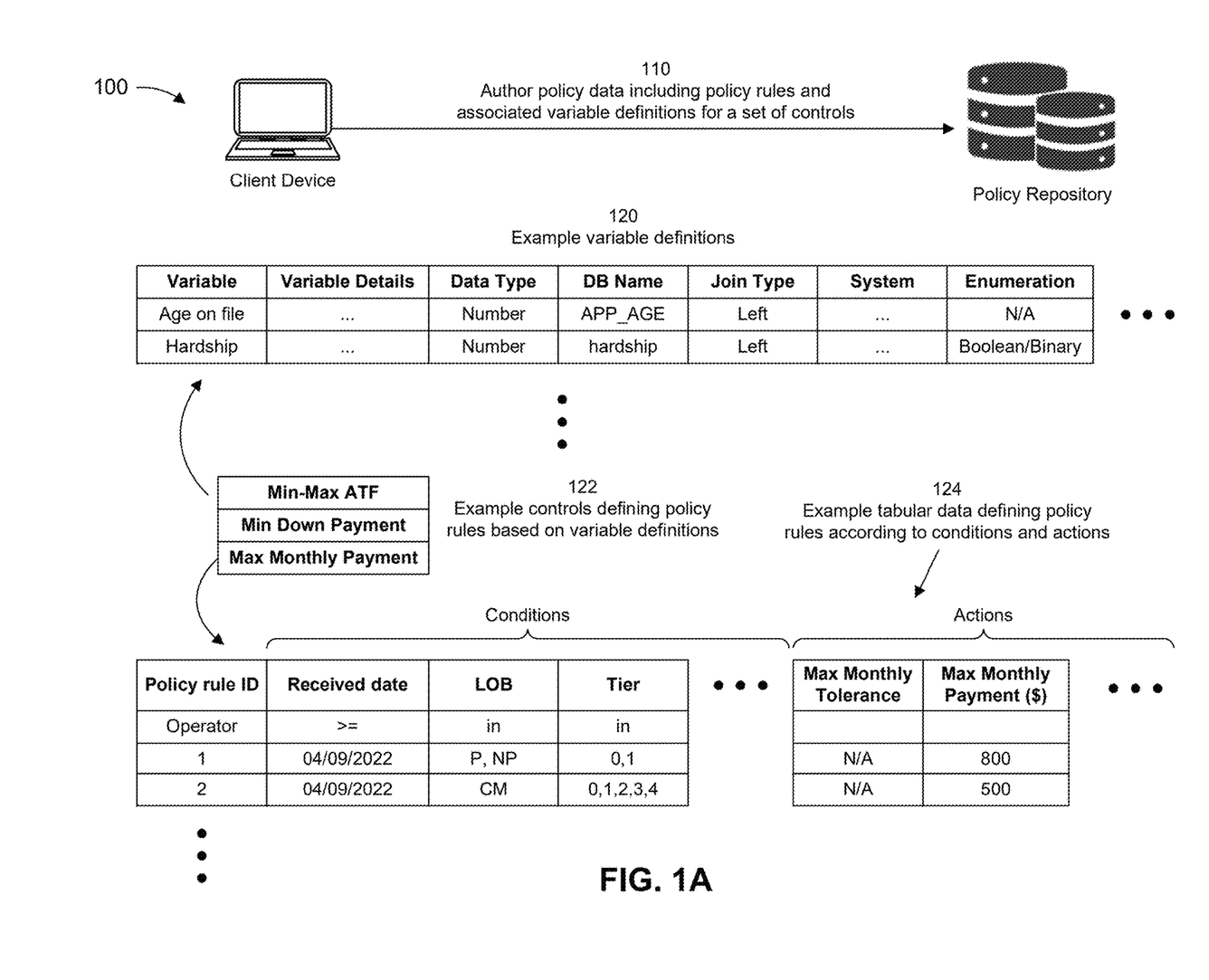
FIGS. 1A-1B are diagrams of an example associated with system for automatically generating scripts to run controls associated with policy rules, in accordance with some embodiments of the present disclosure.
Figure 1B:
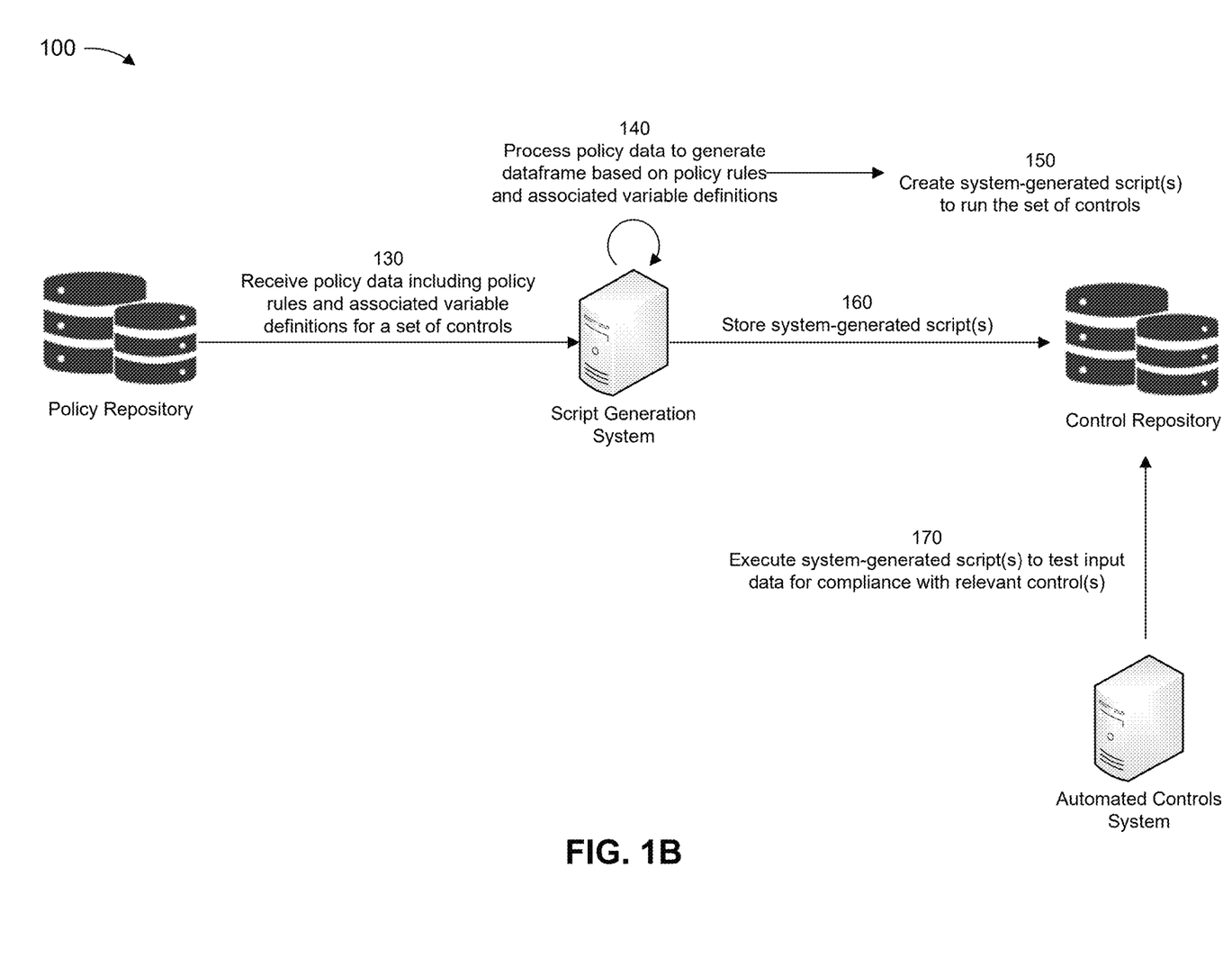

FIGS. 1A-1B are diagrams of an example 100 associated with system for automatically generating scripts to run controls associated with policy rules. As shown in FIGS. 1A-1B, example 100 includes a client device, a policy repository, a script generation system, a control repository, and an automated controls system. The client device, the policy repository, the script generation system, the control repository, and the automated controls system are described in more detail in connection with FIG. 2 and FIG. 3.

As shown in FIG. 1A, and by reference number 110, the client device may author policy data that is stored in the policy repository. For example, in some implementations, the policy data that is authored by the client device and stored in the policy repository may include one or more files, documents, data structures, or other suitable data constructs that represent a governance intent and associated variable definitions for one or more controls according to a mutually exclusive and cumulatively exhaustive (MECE) data organization. In particular, as described herein, the policy data stored in the policy repository may be organized into subsets that are mutually exclusive (e.g., each subset corresponding to a set of controls is disjoint from subsets corresponding to other controls) and collectively exhaustive (e.g., encompassing an entire range of possible outcomes for a set of controls). Furthermore, as described herein, the policy data may be stored in a tabular format (e.g., organizing information related to variable definitions and policy rules associated with a set of controls in columns, rows, tables, or the like). For example, in some implementations, the policy data may be organized within spreadsheets, comma-separated values (CSV) files, tab-delimited files, fixed field formats, hypertext markup language (HTML) tables, structured query language (SQL) dumps, and/or according to any other suitable tabular data model. Accordingly, as described herein, each unit of the policy data may include a first tabular data unit to represent a set of variable definitions associated with a set of controls, and a set of additional tabular data units that each represent a set of policy rules associated with a single control in the set of controls associated with the unit of the policy data.

For example, in some implementations, the policy data for a set of controls that share a set of variable definitions may be organized within a multi-sheet spreadsheet, where the spreadsheet includes a first sheet that represents the set of variable definitions in a tabular format and one or more additional sheets that each represent a set of policy rules associated with a single control in the tabular format. Additionally, or alternatively, in some implementations, the policy data for a set of controls that share a set of variable definitions may be organized within separate documents, such as a CSV file that represents the set of variable definitions and one or more spreadsheets, CSV files, or other data units that are each associated with the CSV file and represent the policy rules associated with a single control. For example, in cases where the tabular policy data is stored in the CSV format, the policy data may be parsed into separate individual CSV files that each include a single sheet corresponding to a single control associated with a set of policy rules (e.g., each CSV file is a single sheet, with one CSV file per set of policy rules). Additionally, or alternatively, the policy data may be stored in the policy repository using any other suitable tabular data model that provides an MECE data organization for discrete sets of controls and associated variable definitions. Furthermore, in some implementations, the policy repository may be associated with one or more user interfaces that allow the client device to manage authoring, governance, and versioning for the policy data stored in the policy repository. In this way, the policy repository may be used to host and manage information that documents an organizational intent for one or more controls (e.g., the policies that the controls are intended to enforce) and associated variable definitions that the script generation system may use to create system-generated scripts that can be executed to prevent, detect, and/or correct non-compliance with one or more controls.

For example, in FIG. 1A, reference number 120 corresponds to example variable definitions that may be associated with a set of controls, reference number 122 corresponds to example controls that may define policy rules based on the variable definitions, and reference number 124 corresponds to example tabular data that may be used to define a set of policy rules according to one or more conditions and one or more associated actions. In the specific examples illustrated in FIG. 1A, the variable definitions and the associated set of controls may be defined to ensure compliance with organizational policies that relate to a credit decisioning infrastructure in an automobile finance division within a financial institution. However, the variable definitions and the associated set of controls may be defined to ensure compliance with any suitable organizational policies, which may vary between organizations (e.g., between a first financial institution and a second financial institution) and/or between domains (e.g., between a finance domain and an information technology security domain).

For example, as shown in FIG. 1A, and by reference number 120, a set of variable definitions that are associated with a set of controls may be organized in a tabular format where each row defines a variable and each column represents a parameter or other information associated with the variable defined in the respective row. For example, the tabular data may include various columns that are associated with each variable definitions, including a first column that provides a description of the variable, such as an age on file, an applicant address state, an applicant age, a hardship status, an aggregate credit card limit, a credit card account overage, an application received data, and/or an approval indicator in the context of a credit decisioning infrastructure in an automobile finance division. Furthermore, the columns associated with each variable definition may correspond to other suitable parameters that can be used to create system-generated scripts to prevent, detect, and/or correct non-compliance with the controls that are associated with the variable definitions. For example, in some implementations, the other columns may include a mapping of the variable to an analytical database and/or other details related to other information technology tools that store data or information associated with the variable, a data type associated with the variable, a name of the variable in an analytical database, a join type associated with the variable, one or more application program interface (API) calls or other system actions to perform in association with the variable, and/or an enumeration associated with the variable, among other examples.

As further shown in FIG. 1A, and by reference number 122, the policy data stored in the policy repository may define a set of one or more controls that are each associated with the same set of variable definitions. For example, in context with the credit decisioning infrastructure described herein, the set of controls associated with the variable definitions may include a first control to prevent, detect, or correct non-compliance with a first set of policies that relate to a minimum amount to finance (ATF) and a maximum ATF for a vehicle loan application, a second control to prevent, detect, or correct non-compliance with a second set of policies that relate to a minimum down payment for the vehicle loan application, and/or a third control to prevent, detect, or correct non-compliance with a third set of policies that relate to a maximum monthly payment for the vehicle loan application. Furthermore, as described herein, each control may be defined according to tabular data in which each row represents a policy rule and each column represents a condition or an action associated with a policy rule. In some implementations, the tabular data representing one or more conditions and/or one or more actions associated with a policy rule may reference or may otherwise be associated with the set of variable definitions.

For example, as shown by reference number 124, a first column of the tabular data associated with a control may include an identifier associated with a respective policy rule, and other columns may include one or more conditions that are each associated with an operator and one or more actions that indicate a compliant or non-compliant result associated with the respective policy rule. For example, in context with the credit decisioning infrastructure described herein, the conditions that are represented in the columns may include one or more conditions to specify that an application received date is within a target range (e.g., when testing for compliance with a policy rule that became effective on a first date of the target range, or to support auditing activities that occurred during the target range, among other examples). Additionally, or alternatively, the columns may represent conditions such as whether the vehicle loan application is within one or more line of businesses, whether the applicant is a new-to-credit consumer with no credit history or an insufficient credit history, whether the applicant has a credit score with one or more tiers, a service level associated with a vehicle dealer, and/or a state associated with the vehicle loan application (e.g., whether the loan is in a funding state and/or an underwriting state that triggers a requirement to associate the vehicle loan application with one or more tolerances), among other examples. Furthermore, in this context, the columns that represent actions may include a maximum monthly payment amount and a maximum monthly payment tolerance. For example, an action associated with a policy rule may be associated with an action that specifies a maximum monthly payment amount in cases where the vehicle loan application is in a review or approval state (e.g., prior to the monthly payment being finalized) and may be associated with an action that specifies a maximum monthly payment tolerance in cases where the vehicle loan application is in a funding or underwriting state (e.g., after the monthly payment has already been finalized).

Accordingly, as shown in FIG. 1B, and by reference number 130, the script generation system may receive or otherwise obtain, from the policy repository, policy data that includes policy rules and associated variable definitions for a set of controls. For example, as described herein, the policy data that is authored using the client device and stored in the policy repository may generally define information relevant to an intent associated with one or more controls (e.g., policies that the controls are intended to enforce) and variable definitions associated with the one or more controls and/or underlying policy rules in a tabular data format. For example, as described herein, each control may include one or more policy rules associated with one or more conditions (e.g., specifying one or more target variables and one or more operators for the one or more target variables, such as an equals operator, a greater than operator, a less than operator, a not equals operator, an inclusion operator, an exclusion operator, or the like). Furthermore, as described herein, the one or more policy rules associated with each control may include one or more actions (e.g., specifying one or more target variables and one or more target values for the one or more target variables when the corresponding conditions are satisfied, such as a maximum value for a monthly payment variable or a minimum value for a down payment variable when the relevant conditions are satisfied). Furthermore, as described herein, the variable definitions associated with a set of controls may generally define various system parameters that can be used to generate SQL statements or statements in other suitable scripting languages based on the conditions and actions associated with the policy rules for each control (e.g., database mappings, data types, database names, join types, API call parameters, enumerations, or the like). In this way, each control may be defined according to one or more rows of rule policies that collectively describe the governance intent of the associated control (e.g., according to an MECE data organization), with the variable definitions providing information to enable the script generation system 230 to automatically create executable scripts corresponding to each control.

Accordingly, as described herein, the tabular data associated with a given set of controls (e.g., where each control is associated with one or more policy rules and the set of controls is associated with a set of variable definitions) may then be used by the script generation system to create one or more system-generated scripts that can be used to test input data for compliance or non-compliance with the one or more controls. In some implementations, as described herein, the script generation system 230 may obtain the policy data for a set of controls from the policy repository based on one or more event triggers. For example, in some implementations, the script generation system may obtain the policy data for a set of controls to trigger script creation for the set of controls based on an authored update to the policy data for the set of controls (e.g., defining a new unit of policy data for a set of controls, updating the variable definitions or policy rules for one or more controls, or the like). Additionally, or alternatively, the one or more event triggers may include expiration of a periodic interval (e.g., where the script generation system 230 may obtain any new or updated policy data to trigger script creation for the new or updated policy data after the periodic interval expires, such as every N hours, daily, or the like). Additionally, or alternatively, the one or more event triggers may include a manual input (e.g., via the client device or another suitable interface), such as when an audit is being performed to check for compliance with one or more controls.

As further shown in FIG. 1B, and by reference number 140, the script generation system may process the policy data associated with the set of controls to generate a dataframe associated with the set of controls. For example, in some implementations, the script generation system may parse the tabular data that defines the variable definitions associated with the set of controls to obtain the system parameters that can be used to create the system-generated scripts for running the associated controls. In some implementations, the script generation system may then store the system parameters associated with the variable definitions such that the system parameters can be referenced when the script generation system creates the system-generated scripts. Furthermore, in some implementations, the script generation system may parse the tabular data that defines each control to obtain information representing the one or more policy rules associated with each control, the one or more conditions associated with each policy rule, and the one or more actions associated with each policy rule. In some implementations, the script generation system may then populate a dataframe with the information defining the policy rules associated with each control in the set of controls. For example, in some implementations, the dataframe may correspond to a two-dimensional data structure that is size-mutable (e.g., allowing data elements to be appended or deleted after the dataframe is created). Furthermore, the dataframe data structure may be used to store heterogeneous tabular data (e.g., corresponding to conditions associated with a policy rule, actions associated with a policy rule, policy rules associated with a control, variable definitions associated with a control or policy rule, or the like). Furthermore, in some implementations, the dataframe structure may contain labeled axes corresponding to rows and columns, and may support arithmetic operations that align on both row labels and column labels. In addition, each entry in the dataframe data structure may contain a single element, a series of elements, an array, a constant, a data class, or a list-like object.

As further shown in FIG. 1B, and by reference number 150, the script generation system may then create one or more system-generated scripts to run the set of controls that are associated with the two-dimensional dataframe. For example, as described herein, the script generation system may parse the tabular data that defines the policy rules and variable definitions associated with the set of controls to generate the two-dimensional dataframe, which may be defined according to a software library compatible with a programming language for data manipulation and analysis, such as the Pandas software library for the Python programming language. The script generation system may then perform an error check on the dataframe, which may include checking the dataframe for missing variable definitions (e.g., based on conditions, actions, or other policy rule information referencing a variable that is not included in the set of variable definitions associated with the dataframe). Additionally, or alternatively, the error check may include checking the dataframe for any incorrect formatting. In some implementations, in cases where the script generation system identifies one or more errors (e.g., missing variable definitions and/or incorrect formatting), the script generation system may generate an error message that may be presented to the client device such that the errors can be appropriately corrected. For example, in some implementations, a user of the client device may update the policy data in the policy repository to provide one or more missing variable definitions and/or to correct formatting issues with the variable definitions, policy rules, actions, and/or conditions associated with the one or more controls.

Alternatively, in cases where the script generation system determines that the dataframe is error-free (e.g., all relevant variables are defined and the dataframe does not have formatting issues), the script generation system may then create one or more executable scripts based on the dataframe. For example, in some implementations, the dataframe may be passed to a script template (e.g., a Jinja template), and the script generation system may invoke a template engine or other suitable component that creates the executable script(s) based on the dataframe. For example, in some implementations, the template engine or other suitable component associated with the script generation system may traverse each row of the dataframe and may use string manipulations to create the executable scripts associated with the set of controls, where each executable script may include a sequence of commands to test for compliance with a particular control. For example, in some implementations, the script generation system may traverse each row of the dataframe to generate the sequence of commands based on information in each column associated with the respective row (e.g., defining conditions, actions, or other suitable information associated with a policy rule or control) and the set of variable definitions associated with the one or more controls (e.g., which may be defined in the dataframe, based on the dataframe having a capability to store heterogeneous tabular data, or in a separate data construct that the script generation system references during script creation).

As further shown in FIG. 1B, and by reference number 160, the script generation system may then store the executable script(s) associated with the set of controls in the control repository. For example, in some implementations, the script generation system may create a single system-generated script to run all of the controls in a set of controls that share a set of variable definitions, or the script generation system may create respective system-generated script to run individual controls. In any case, as shown by reference number 170, the automated controls system may then execute one or more of the system-generated scripts to test input data for compliance with the relevant controls. For example, in the vehicle financing context described herein, the input data may correspond to an ATF value, a down payment value, a monthly payment value, or other suitable information associated with a vehicle loan application. In this case, the automated controls system may run the system-generated scripts to test whether the input satisfies one or more controls related to a minimum ATF value, a minimum down payment value, a maximum monthly payment value, or other suitable controls related to vehicle financing. Furthermore, the input data may correspond to vehicle loan applications that are in-progress or vehicle loan applications that have already been processes, whereby the automated controls system may execute the system-generated scripts in a preventative, detective, or corrective context. For example, the system-generated scripts may be executed to test the input data and prevent instances of non-compliance with one or more controls, to detect or identify instances of non-compliance with one or more controls, and/or to correct detected or identified instances of non-compliance with one or more controls.

As indicated above, FIGS. 1A-1B are provided as an example. Other examples may differ from what is described with regard to FIGS. 1A-1B.

Figure 2:
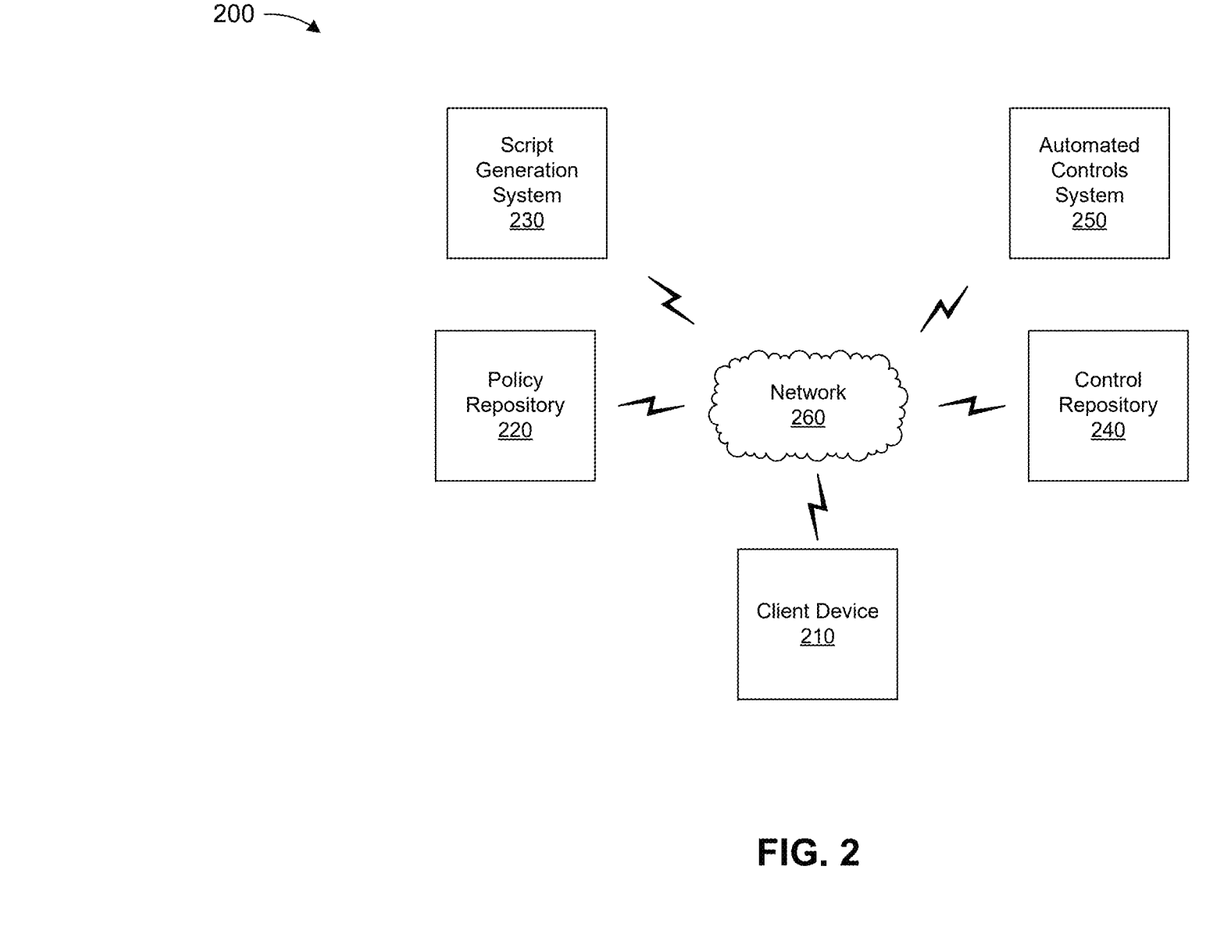
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a client device 210, a policy repository 220, a script generation system 230, a control repository 240, an automated controls system 250, and a network 260. Devices of environment 200 may interconnect via wired connections, wireless connections, or a combination of wired and wireless connections.

The client device 210 may include one or more devices capable of receiving, generating, storing, processing, and/or providing information associated with system for automatically generating scripts to run controls associated with policy rules, as described elsewhere herein. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The policy repository 220 may include one or more devices capable of receiving, generating, storing, processing, and/or providing information associated with a system for automatically generating scripts to run controls associated with policy rules, as described elsewhere herein. The policy repository 220 may include a communication device and/or a computing device. For example, the policy repository 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the policy repository 220 may store policy data in a tabular format, where the policy data includes one or more data structures that each include information to define one or more policy rules associated with a respective control, and a set of variable definitions associated with the one or more data structures, as described elsewhere herein.

The script generation system 230 may include one or more devices capable of receiving, generating, storing, processing, providing, and/or routing information associated with system for automatically generating scripts to run controls associated with policy rules, as described elsewhere herein. The script generation system 230 may include a communication device and/or a computing device. For example, the script generation system 230 may include a server, such as an application server, a client server, a web server, a database server, a host server, a proxy server, a virtual server (e.g., executing on computing hardware), or a server in a cloud computing system. In some implementations, the script generation system 230 may include computing hardware used in a cloud computing environment.

The control repository 240 may include one or more devices capable of receiving, generating, storing, processing, and/or providing information associated with system for automatically generating scripts to run controls associated with policy rules, as described elsewhere herein. The control repository 240 may include a communication device and/or a computing device. For example, the control repository 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the control repository 240 may store one or more system-generated scripts that are created by the script generation system 230 based on policy data obtained from the policy repository 220, as described elsewhere herein.

The automated controls system 250 may include one or more devices capable of receiving, generating, storing, processing, providing, and/or routing information associated with system for automatically generating scripts to run controls associated with policy rules, as described elsewhere herein. The automated controls system 250 may include a communication device and/or a computing device. For example, the automated controls system 250 may include a server, such as an application server, a client server, a web server, a database server, a host server, a proxy server, a virtual server (e.g., executing on computing hardware), or a server in a cloud computing system. In some implementations, the automated controls system 250 may include computing hardware used in a cloud computing environment.

The network 260 may include one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
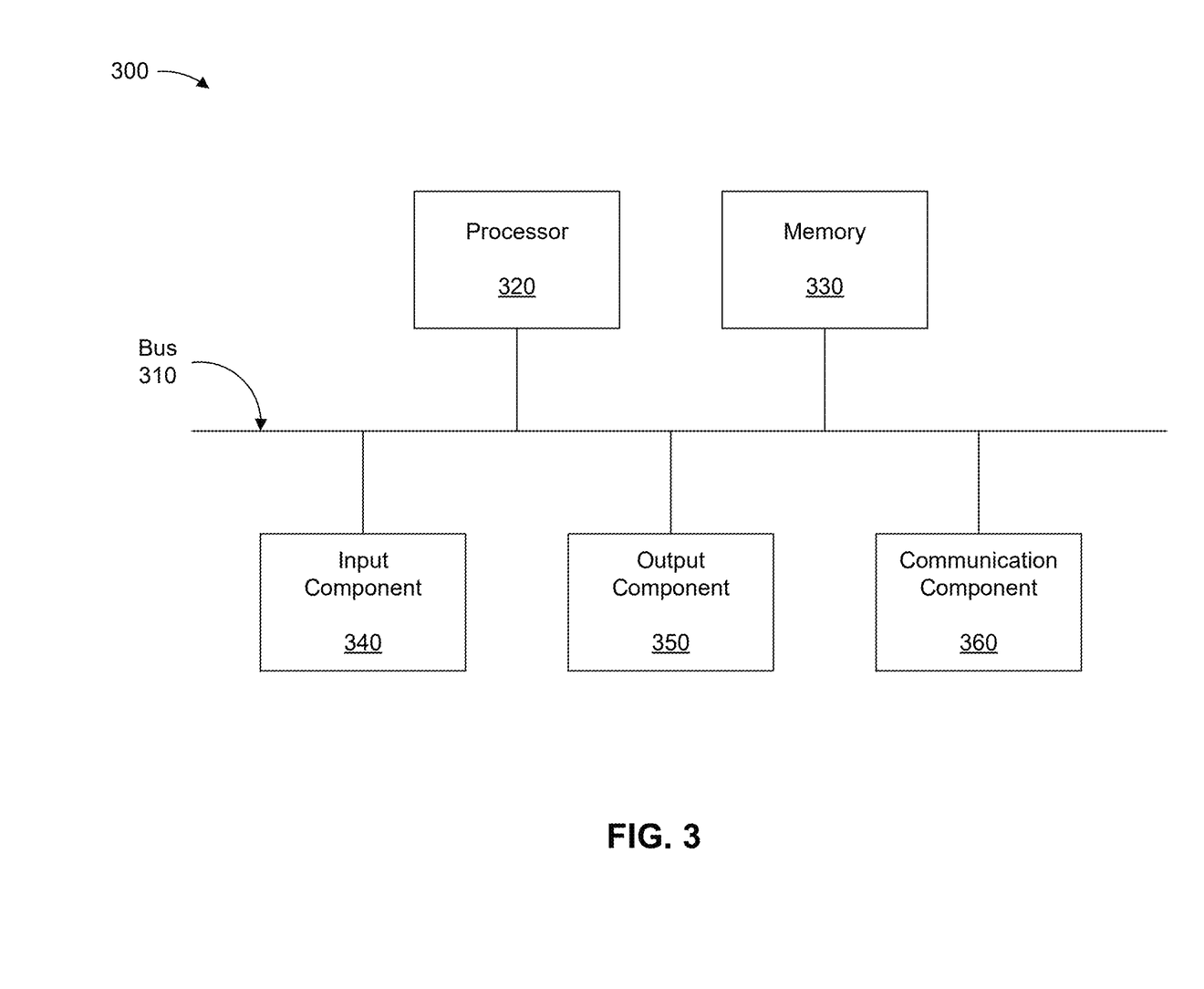
FIG. 3 is a diagram of example components of a device associated with system for automatically generating scripts to run controls associated with policy rules, in accordance with some embodiments of the present disclosure.

FIG. 3 is a diagram of example components of a device 300 associated with system for automatically generating scripts to run controls associated with policy rules. The device 300 may correspond to the client device 210, the policy repository 220, the script generation system 230, the control repository 240, and/or the automated controls system 250. In some implementations, the client device 210, the policy repository 220, the script generation system 230, the control repository 240, and/or the automated controls system 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
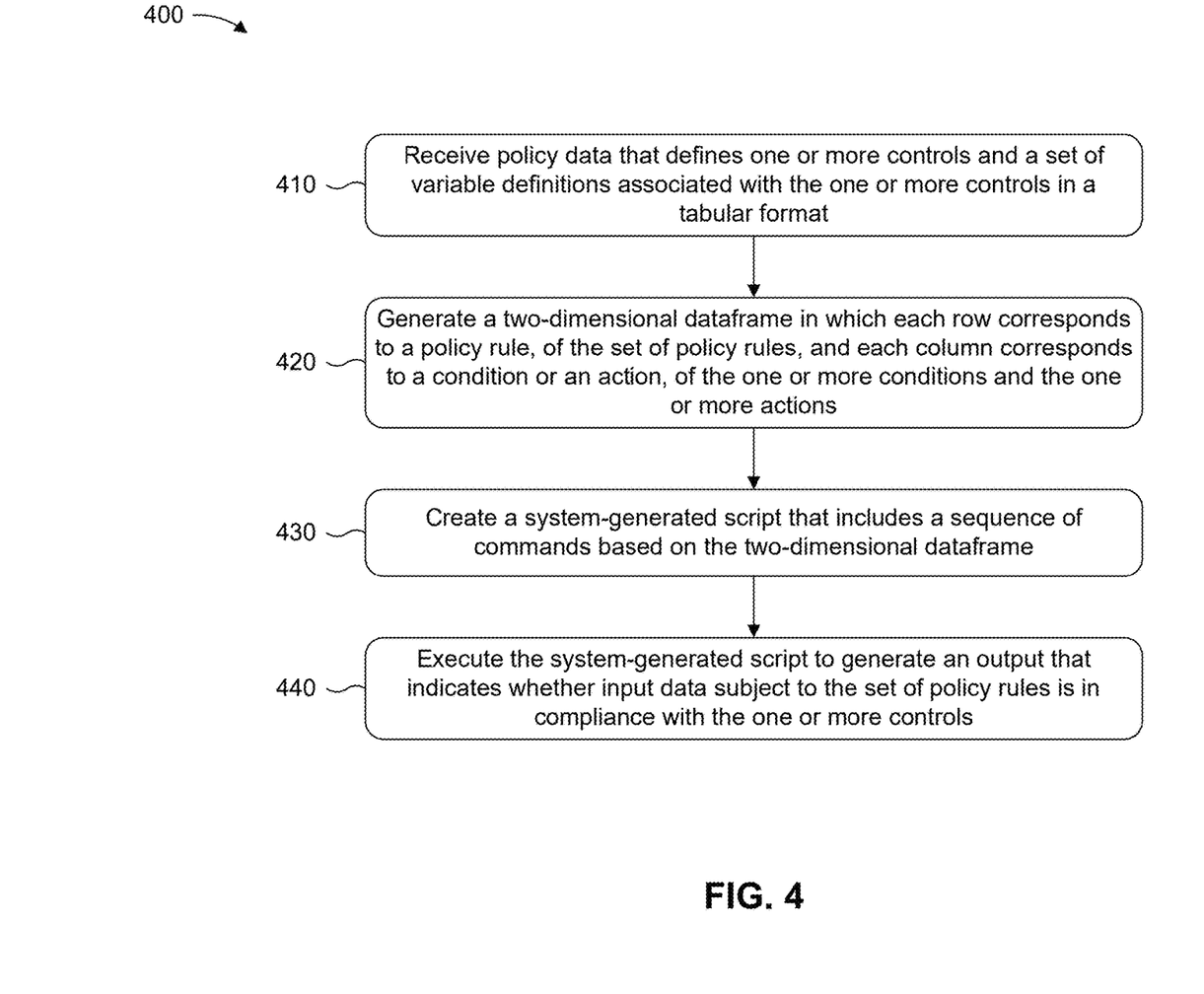
FIG. 4 is a flowchart of an example process associated with system for automatically generating scripts to run controls associated with policy rules, in accordance with some embodiments of the present disclosure.

FIG. 4 is a flowchart of an example process 400 associated with system for automatically generating scripts to run controls associated with policy rules. In some implementations, one or more process blocks of FIG. 4 may be performed by the script generation system 230. In some implementations, one or more process blocks of FIG. 4 may be performed by another device or a group of devices separate from or including the script generation system 230, such as the client device 210, the policy repository 220, the control repository 240, and/or the automated controls system 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving policy data that defines one or more controls and a set of variable definitions associated with the one or more controls in a tabular format (block 410). For example, the script generation system 230 (e.g., using processor 320, memory 330, input component 340, and/or communication component 360) may receive policy data that defines one or more controls and a set of variable definitions associated with the one or more controls in a tabular format, as described above in connection with reference number 110 of FIG. 1A and/or reference numbers 120, 122, and 124 of FIG. 1B. In some implementations, the one or more controls are each defined according to a set of policy rules that each include one or more conditions and one or more actions. As an example, the policy data may include a set of variable definitions that are provided in a tabular format to represent system parameters for manipulating and/or otherwise processing one or more variables, and each control may be associated with tabular data that defines one or more policy rules associated with the control according to one or more conditions (e.g., target variables satisfying one or more conditions) and one or more actions (e.g., values for target variables when the one or more conditions associated with the policy rule are satisfied).

As further shown in FIG. 4, process 400 may include generating a two-dimensional dataframe in which each row corresponds to a policy rule, of the set of policy rules, and each column corresponds to a condition or an action, of the one or more conditions and the one or more actions (block 420). For example, the script generation system 230 (e.g., using processor 320 and/or memory 330) may generate a two-dimensional dataframe in which each row corresponds to a policy rule, of the set of policy rules, and each column corresponds to a condition or an action, of the one or more conditions and the one or more actions, as described above in connection with reference number 130 of FIG. 1A. As an example, the dataframe may correspond to a two-dimensional data structure (e.g., a Pandas dataframe) that can store heterogeneous tabular data, such as the tabular data defining the policy rules associated with a set of controls and the variable definitions associated with the set of controls.

As further shown in FIG. 4, process 400 may include creating a system-generated script that includes a sequence of commands based on the two-dimensional dataframe (block 430). For example, the script generation system 230 (e.g., using processor 320 and/or memory 330) may create a system-generated script that includes a sequence of commands based on the two-dimensional dataframe, as described above in connection with reference number 140 of FIG. 1A. In some implementations, each command in the sequence of commands is generated from a row of the two-dimensional dataframe using string manipulations based on information in each column associated with the respective row and the set of variable definitions associated with the one or more controls. As an example, the script generation system may pass the dataframe to an SQL template or another suitable scripting template, which may process the dataframe row-by-row and use string manipulations to generate the sequence of commands (e.g., SQL commands or statements) to run each control based on the policy rules associated with the control and the variable definitions associated with the conditions and/or actions defining the policy rules.

As further shown in FIG. 4, process 400 may include executing the system-generated script to generate an output that indicates whether input data subject to the set of policy rules complies with the one or more controls (block 440). For example, the script generation system 230 (e.g., using processor 320 and/or memory 330) may execute the system-generated script to generate an output that indicates whether input data subject to the set of policy rules complies with the one or more controls, as described above in connection with reference number 160 of FIG. 1A. As an example, the system-generated script may be executed in a preventative, detective, or corrective context, whereby the system-generated script may be executed to prevent instances of the input data failing to comply with one or more controls, to detect or identify instances of the input data failing to comply with one or more controls, and/or to correct detected or identified instances of the input data failing to comply with one or more controls.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automatically generating scripts to run controls that test for policy data compliance, the system comprising:
   one or more memories; and
   one or more processors, communicatively coupled to the one or more memories, configured to:
     receive policy data that defines one or more controls and a set of variable definitions associated with the one or more controls in a tabular format,
       wherein the one or more controls are each defined according to a set of policy rules that each include one or more conditions and one or more actions;
     generate a two-dimensional dataframe in which each row corresponds to a policy rule, of the set of policy rules, and each column corresponds to a condition or an action, of the one or more conditions and the one or more actions;
     create a system-generated script that includes a sequence of commands based on the two-dimensional dataframe,
       wherein each command in the sequence of commands is generated from a row of the two-dimensional dataframe using string manipulations based on information in each column associated with the respective row and the set of variable definitions associated with the one or more controls; and
     execute the system-generated script to generate an output that indicates whether input data subject to the set of policy rules complies with the one or more controls.

2. The system of claim 1, wherein the one or more processors are further configured to:
   parse the policy data to obtain the set of variable definitions associated with the one or more controls; and
   reference the set of variable definitions to check the two-dimensional dataframe for missing variable definitions and to perform the string manipulations based on the information in each column associated with a row in the two-dimensional dataframe.

3. The system of claim 1, wherein the tabular format is a comma separated value (CSV) format, and wherein the one or more processors are further configured to:
   parse the policy data in the CSV format to obtain one or more individual CSV files that each include a single sheet corresponding to a control, of the one or more controls.

4. The system of claim 1, wherein the one or more processors are further configured to:
   perform an error check to determine whether the two-dimensional dataframe is missing one or more variable definitions or has incorrect formatting,
     wherein the system-generated script is created based on the error check indicating that the two-dimensional dataframe is not missing any variable definitions and does not have incorrect formatting.

5. The system of claim 1, wherein the system-generated script is created based on a structured query language (SQL) template.

6. The system of claim 1, wherein the set of policy rules associated with each control represent a governance intent associated with the respective control.

7. The system of claim 1, wherein the one or more processors are configured to create the system-generated script from the policy data based on one or more event triggers.

8. The system of claim 7, wherein the one or more event triggers relate to one or more of an authored update to the policy data or expiration of a periodic interval.

9. A method for automatically generating scripts, comprising:
   receiving, by a system, policy data that defines one or more controls and a set of variable definitions associated with the one or more controls in a tabular format;
   generating, by the system, a two-dimensional dataframe in which each row corresponds to a policy rule, of the set of policy rules;
   creating, by the system, a system-generated script that includes a sequence of commands based on the two-dimensional dataframe,
     wherein each command in the sequence of commands is generated from a row of the two-dimensional dataframe using string manipulations based on information in each column associated with the respective row and the set of variable definitions associated with the one or more controls; and
   executing, by the system, the system-generated script to generate an output that indicates whether input data subject to the set of policy rules complies with the one or more controls.

10. The method of claim 9, further comprising:
    parsing the policy data to obtain the set of variable definitions associated with the one or more controls; and referencing the set of variable definitions to check the two-dimensional dataframe for missing variable definitions and to perform the string manipulations based on the information in each column associated with a row in the two-dimensional dataframe.

11. The method of claim 9, wherein the tabular format is a comma separated value (CSV) format, and wherein the method further comprises:
parsing the policy data in the CSV format to obtain one or more individual CSV files that each include a single sheet corresponding to a control, of the one or more controls.

12. The method of claim 9, further comprising:
performing an error check to determine whether the two-dimensional dataframe is missing one or more variable definitions or has incorrect formatting,
wherein the system-generated script is created based on the error check indicating that the two-dimensional dataframe is not missing any variable definitions and does not have incorrect formatting.

13. The method of claim 9, wherein the system-generated script is created based on a structured query language (SQL) template.

14. The method of claim 9, wherein the set of policy rules associated with each control represent a governance intent associated with the respective control.

15. The method of claim 9, wherein the system-generated script is created from the policy data based on one or more event triggers.

16. A non-transitory computer-readable medium storing a set of instructions, the set of instructions comprising:
one or more instructions that, when executed by one or more processors of a script generation system, cause the script generation system to:
receive policy data that defines one or more controls and a set of variable definitions associated with the one or more controls in a tabular format;
generate a two-dimensional dataframe in which each row corresponds to a policy rule, of the set of policy rules; and
create a system-generated script that includes a sequence of commands based on the two-dimensional dataframe,
wherein each command in the sequence of commands is generated from a row of the two-dimensional dataframe using string manipulations based on information in each column associated with the respective row and the set of variable definitions associated with the one or more controls; and
execute the system-generated script to generate an output that indicates whether input data subject to the set of policy rules complies with the one or more controls.

17. The non-transitory computer-readable medium of claim 16, wherein the one or more instructions further cause the script generation system to:
parse the policy data to obtain the set of variable definitions associated with the one or more controls; and
reference the set of variable definitions to check the two-dimensional dataframe for missing variable definitions and to perform the string manipulations based on the information in each column associated with a row in the two-dimensional dataframe.

18. The non-transitory computer-readable medium of claim 16, wherein the tabular format is a comma separated value (CSV) format, and wherein the one or more processors are further configured to:
parse the policy data in the CSV format to obtain one or more individual CSV files that each include a single sheet corresponding to a control, of the one or more controls.

19. The non-transitory computer-readable medium of claim 16, wherein the one or more instructions further cause the script generation system to:
perform an error check to determine whether the two-dimensional dataframe is missing one or more variable definitions or has incorrect formatting,
wherein the system-generated script is created based on the error check indicating that the two-dimensional dataframe is not missing any variable definitions and does not have incorrect formatting.

20. The non-transitory computer-readable medium of claim 16, wherein the one or more instructions further cause the script generation system to create the system-generated script from the policy data based on one or more event triggers.

\* \* \* \* \*